Sept. 15, 1931.    O. B. CAHOON ET AL    1,823,587
WET PROCESS DUST COLLECTION
Filed Sept. 27, 1928    2 Sheets-Sheet 1
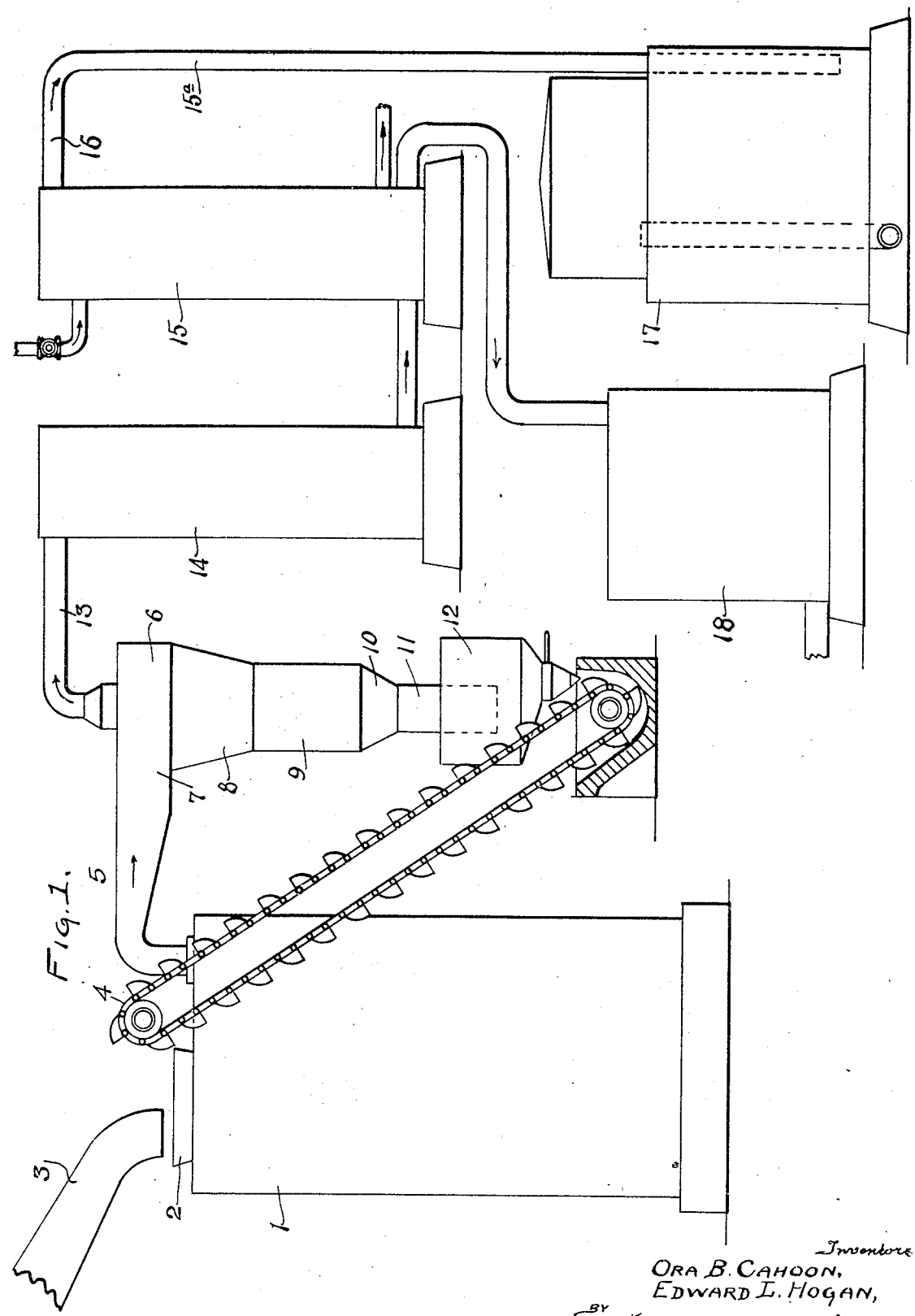
Inventors
ORA B. CAHOON,
EDWARD L. HOGAN,
BY Toulmin + Toulmin
Attorneys

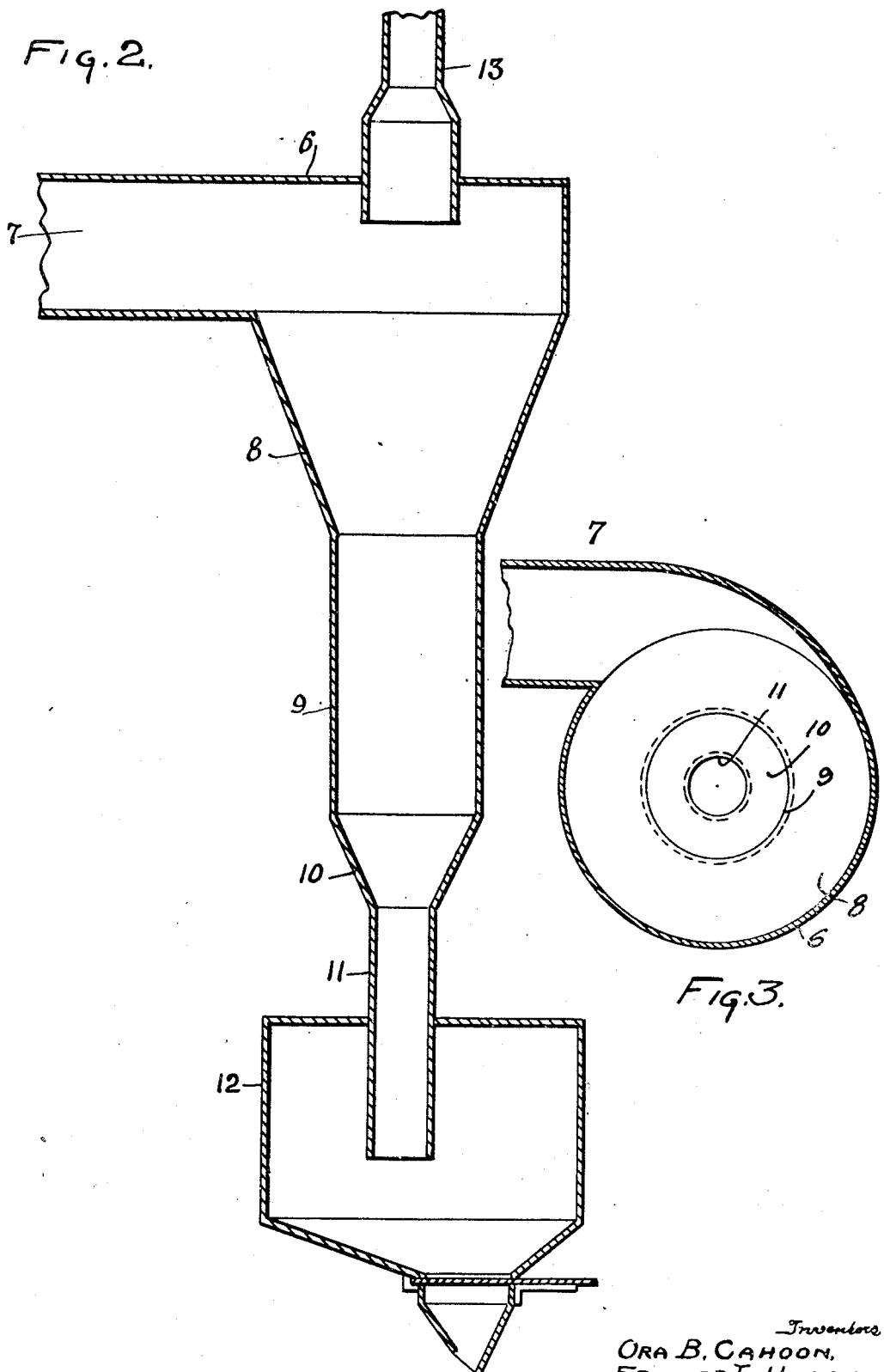

Patented Sept. 15, 1931

1,823,587

UNITED STATES PATENT OFFICE

ORA B. CAHOON, OF CHICAGO, ILLINOIS, AND EDWARD L. HOGAN, OF DETROIT, MICHIGAN, ASSIGNORS TO AMERICAN BLOWER CORPORATION, OF DETROIT, MICHIGAN, A CORPORATION OF DELAWARE

WET PROCESS DUST COLLECTION

Original application filed August 22, 1927, Serial No. 214,532. Divided and this application filed September 27, 1928. Serial No. 308,727.

Our invention relates to dust collecting and is a division of our application Serial No. 214,532, filed August 22, 1927.

It is the object of our invention to provide an apparatus and a method for extracting dust from hot oil and tar laden gas producer gases without collecting the oil and tar which are in fluid and plastic state, and without materially reducing the temperature of the gas, and thereby bringing about a precipitation of the oil and tar fractions carried by the gas.

It is a further object of our invention to provide means of removing the dust from such a gas, recovering the dust for re-burning in the gas producer and for collecting separately thereafter the gas free from dust, oils and tars, and the oils and tars free from dust, so that the oil can be handled and will not solidify and cake.

Heretofore, when oils and tars have been extracted from the gas producer gas it has been found that they collect in a solid brittle mass upon cooling so that makes it impossible to handle the precipitate without chipping it. Such a mass also clogs the pumps and other apparatus associated with the gas producer system causing lengthy and expensive shut downs and the like.

Referring to the drawings:

Figure 1 is a diagrammatic view of the complete system;

Figure 2 is a vertical section through a typical collector having the desirable characteristics for utilization in this method.

Figure 3 is a horizontal section through the collector.

Referring to the drawings, 1 is a gas producer having a charging hopper 2 which is charged from a spout 3 and from the the conveyor 4. A gas pipe 5 leads from the gas producer to a collector 6. The entrance throat 7 of the collector being of full depth of the collector drum. This collector is formed with the tapered hopper bottom 8, a cylindrical passageway 9, a second tapered bottom 10, and a pipe 11 in sealed engagement with a hopper 12. From this hopper, the dust collected therein is dumped on the conveyor 4 and returned to the gas producer to be fed into it in the normal manner.

The collector 6 is a scroll collector of the type illustrated and described herein having a central exit line 13 which leads to a tar precipitator 14 whence the tar is conveyed to a cooler for the gas designated 15, the gas making its exit through the pipe 16 to a collector 17 while the tar is drained off to a tar storage tank 18. The gases can then be utilized with fuel while the tar can be used in the system for enriching purposes.

The gas coming off of the producer is laden with three primary elements: tar; the light oils; and solid products of combustion together with some carbon in the form of dust.

It is desirable to extract this dust and return it in its dry condition to the producer for reburning as it is largely composed of powdered coal which has not been completely consumed. We, therefore, pass the gas containing these three constituents at a predetermined speed into the collector. The gas, dust, oil and tar move in a centrifugal path within the collector. The speed is so adjusted that the heavier dust is thrown out against the inside of the wall of the collector where it drops down by gravity into the hopper 8, pipe 9, hopper 10, pipe 11 into the trap 12 in finely divided dry condition. Neither the speed nor temperature of the gas is sufficient to bring about the precipitation of the oil materials, such as the oil and tar which is carried upwardly out the pipe 13 from the center of the whirling gases. The gas containing the tar and oils passes to the tar precipitator and tar cooler whence the gas is extracted and the tar run into storage where it remains an oily mass readily handled as it is in plastic condition. Before our invention, this same mass would quickly cake into a hard brittle body choking all of the machinery with which it came in contact causing large and expensive shutdowns in the power plant.

Our invention permits of the substitution of a small collector of our type which is particularly adapted for this work, although we do not want to be confined to the details of a collector, in the place of very large and elaborate equipment heretofore used in an attempt to precipitate out the dust from the gas, tar and oil, but such mechanism has never been successful, so that it has been necessary to shut the plant down from time to time, or the plant automatically shuts down due to stoppages by reason of the heavy contents of the dust, oils and tars.

The temperature of the gases is maintained to prevent precipitation of the oils and tars in suspension, while the speed of rotation is only sufficient to extract the dust, but not the oils and tars.

The clean gas may be used anywhere for any purpose to utilize the heat contained therein. The minute fluid contents is in such suspension in the gas, of colloidal fineness or otherwise, that it is suitably carried through the collector until cooled and precipitated, but only dust is collected in the collector. We use solids and liquids in the generic, rather than the literal sense, as the suspension thereof, particularly of liquids such as oils and tars, may be collodial.

It will be understood that we desire to comprehend within our invention such modifications as may be clearly embraced in our claims and within the scope of our invention.

Having thus fully described our invention, what we claim as new and desire to secure by Letters Patent, is:

1. In combination, a collector for extracting dust from tar-bearing gases in which the tar is held in suspension, a tar precipitator connected at its upper end to the collector for receiving the tar-bearing gas therefrom, a cooler connected at its lower end to the lower end of the tar precipitator for receiving the separated gas and tar, a tar storage tank connected to the lower end of the cooler, and a gas collector tank connected to the upper end of the cooler.

2. In combination, a collector for receiving gas and giving it a downward direction therein and causing it to assume a central upward direction therein, a tar precipitator connected to said collector and adapted to receive the gas from the collector in the upper end thereof, said tar precipitator being adapted to permit the expansion of the gas whereby tar and other high boiling ingredients are precipitated, a cooler connected to the lower end of said precipitator for receiving the gas and the tar therefrom, a tank connected to the cooler for storing the tar, and a second tank connected to the upper end of the cooler for storing the gas.

In testimony whereof, we affix our signatures.

ORA B. CAHOON.
EDWARD L. HOGAN.